(12) United States Patent
Boettcher

(10) Patent No.: US 7,729,791 B2
(45) Date of Patent: Jun. 1, 2010

(54) PORTABLE MEDIA PLAYBACK DEVICE INCLUDING USER INTERFACE EVENT PASSTHROUGH TO NON-MEDIA-PLAYBACK PROCESSING

(75) Inventor: Jesse Boettcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 727 days.

(21) Appl. No.: 11/530,773

(22) Filed: Sep. 11, 2006

(65) Prior Publication Data

US 2008/0125890 A1    May 29, 2008

(51) Int. Cl.
G06F 17/00 (2006.01)
(52) U.S. Cl. ............................ 700/94
(58) Field of Classification Search .......... 700/94; 713/100
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,406,305 A | 4/1995 | Shimomura et al. |
| 5,559,945 A | 9/1996 | Beaudet et al. |
| 5,566,337 A | 10/1996 | Szymanski et al. |
| 5,583,993 A | 12/1996 | Foster et al. |
| 5,608,698 A | 3/1997 | Yamanoi et al. |
| 5,616,876 A | 4/1997 | Cluts |

(Continued)

FOREIGN PATENT DOCUMENTS

DE    43 34 773 A1    4/1994

(Continued)

OTHER PUBLICATIONS

"Apple Announces iTunes 2," Press Release, Apple Computer, Inc., Oct. 23, 2001.

(Continued)

*Primary Examiner*—Andrew C Flanders
(74) *Attorney, Agent, or Firm*—Beyer Law Group LLP

(57) ABSTRACT

A method of operating a portable electronics device can include integrated operation of media playback processing and non-media-playback processing (such as, for example, a game). The method can include receiving an event corresponding to operation of a user interface item by a user of the portable electronics device. The received event can be provided to the non-media-playback processing. The non-media-playback processing can determine whether to cause an action corresponding to the provided received event with respect to the non-media-playback processing. For an event determined by the non-media-playback processing to not cause an action corresponding to the provided received event with respect to the non-media-playback processing, the provided received event can be provided to the media playback processing. Typically, the operating performed by the media playback processing based on the event can be the processing that would otherwise be performed by the media playback processing if the non-media-playback processing was not even occurring.

18 Claims, 2 Drawing Sheets

U.S. PATENT DOCUMENTS

| | | |
|---|---|---|
| 5,617,386 A | 4/1997 | Choi |
| 5,670,985 A | 9/1997 | Cappels, Sr. et al. |
| 5,684,513 A | 11/1997 | Decker |
| 5,710,922 A | 1/1998 | Alley et al. |
| 5,712,949 A | 1/1998 | Kato et al. |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |
| 5,778,374 A | 7/1998 | Dang et al. |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 | 9/2002 | Reinhardt et al. |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,789 B1 | 8/2003 | Darley |
| 6,617,963 B1 | 9/2003 | Watters et al. |
| 6,621,768 B1 | 9/2003 | Keller et al. |
| 6,623,427 B2 | 9/2003 | Mandigo |
| 6,631,101 B1 | 10/2003 | Chan et al. |
| 6,693,612 B1 | 2/2004 | Matsumoto et al. |
| 6,731,312 B2 | 5/2004 | Robbin |
| 6,760,536 B1 | 7/2004 | Amir et al. |
| 6,762,741 B2 | 7/2004 | Weindorf |
| 6,794,566 B2 | 9/2004 | Pachet |
| 6,799,226 B1 | 9/2004 | Robbin et al. |
| 6,801,964 B1 | 10/2004 | Mahdavi |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,931,377 B1 | 8/2005 | Seya |
| 6,934,812 B1 | 8/2005 | Robbin et al. |
| 6,950,087 B2 | 9/2005 | Knox et al. |
| 7,028,096 B1 | 4/2006 | Lee |
| 7,046,230 B2 | 5/2006 | Zadesky |
| 7,062,225 B2 | 6/2006 | White |
| 7,069,044 B2 | 6/2006 | Okada et al. |
| 7,076,561 B1 | 7/2006 | Rosenberg et al. |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,143,241 B2 | 11/2006 | Hull |
| 7,146,437 B2 | 12/2006 | Robbin et al. |
| 7,171,331 B2 | 1/2007 | Vock et al. |
| 7,191,244 B2 | 3/2007 | Jennings et al. |
| 7,213,228 B2 | 5/2007 | Putterman et al. |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 | 4/2008 | Le et al. |
| 7,508,535 B2 | 3/2009 | Hart et al. |
| 2001/0013983 A1 | 8/2001 | Izawa et al. |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0028683 A1 | 3/2002 | Banatre et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0090912 A1 | 7/2002 | Cannon et al. |
| 2002/0116082 A1 | 8/2002 | Gudorf |
| 2002/0123359 A1 | 9/2002 | Wei et al. |
| 2002/0152045 A1 | 10/2002 | Dowling et al. |
| 2002/0156833 A1 | 10/2002 | Maurya et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0007001 A1 | 1/2003 | Zimmerman |
| 2003/0018799 A1 | 1/2003 | Eyal |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0229490 A1 | 12/2003 | Etter |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |

| | | | | | | |
|---|---|---|---|---|---|---|
| 2004/0069122 | A1 | 4/2004 | Wilson | GB | 2384399 | 7/2003 |
| 2004/0076086 | A1 | 4/2004 | Keller | JP | 59-023610 | 2/1984 |
| 2004/0086120 | A1 | 5/2004 | Akins, III et al. | JP | 03-228490 | 10/1991 |
| 2004/0094018 | A1 | 5/2004 | Ueshima et al. | JP | 04-243386 | 8/1992 |
| 2004/0125522 | A1 | 7/2004 | Chiu et al. | JP | 6-96520 | 4/1994 |
| 2004/0165302 | A1 | 8/2004 | Lu | JP | 8-235774 | 9/1996 |
| 2004/0177063 | A1 | 9/2004 | Weber et al. | JP | 9-50676 | 2/1997 |
| 2004/0198436 | A1 | 10/2004 | Alden | JP | 9-259532 | 10/1997 |
| 2004/0224638 | A1 | 11/2004 | Fadell et al. | JP | 2000-90651 | 3/2000 |
| 2004/0267825 | A1 | 12/2004 | Novak et al. | JP | 2000-224099 | 8/2000 |
| 2005/0015254 | A1 | 1/2005 | Beaman | JP | 2000-285643 | 10/2000 |
| 2005/0053365 | A1 | 3/2005 | Adams et al. | JP | 2000-299834 | 10/2000 |
| 2005/0108754 | A1 | 5/2005 | Carhart et al. | JP | 2000-311352 | 11/2000 |
| 2005/0110768 | A1 | 5/2005 | Marriott et al. | JP | 2000-339864 | 12/2000 |
| 2005/0111820 | A1 | 5/2005 | Matsumi et al. | JP | 2001-236286 | 8/2001 |
| 2005/0122315 | A1 | 6/2005 | Chalk et al. | JP | 2001-312338 | 11/2001 |
| 2005/0123886 | A1 | 6/2005 | Hua et al. | JP | 2002-076977 | 3/2002 |
| 2005/0152294 | A1 | 7/2005 | Yu et al. | JP | 2002-175467 | 6/2002 |
| 2005/0160270 | A1 | 7/2005 | Goldberg et al. | JP | 2003-188792 | 7/2003 |
| 2005/0166153 | A1 | 7/2005 | Eytchison et al. | JP | 2003-259333 | 9/2003 |
| 2005/0234983 | A1 | 10/2005 | Plastina et al. | JP | 2003-319365 | 11/2003 |
| 2005/0245839 | A1 | 11/2005 | Stivoric et al. | JP | 2004-021720 | 1/2004 |
| 2005/0248555 | A1 | 11/2005 | Feng et al. | JP | 2004-219731 | 8/2004 |
| 2005/0257169 | A1 | 11/2005 | Tu | JP | 2004-220420 | 8/2004 |
| 2005/0259064 | A1 | 11/2005 | Sugino et al. | KR | 20010076508 | 8/2001 |
| 2005/0259524 | A1 | 11/2005 | Yeh | WO | WO 01/33569 | 6/1995 |
| 2006/0013414 | A1 | 1/2006 | Shih | WO | WO 95/16950 | 6/1995 |
| 2006/0068760 | A1 | 3/2006 | Hameed et al. | WO | WO 98/17032 | 4/1998 |
| 2006/0088228 | A1 | 4/2006 | Marriott et al. | WO | WO 99/28813 | 6/1999 |
| 2006/0094409 | A1 | 5/2006 | Inselberg | WO | WO 00/22820 | 4/2000 |
| 2006/0095502 | A1 | 5/2006 | Lewis et al. | WO | WO 01/65413 | 9/2001 |
| 2006/0098320 | A1 | 5/2006 | Koga et al. | WO | WO 01/67753 | 9/2001 |
| 2006/0135883 | A1 | 6/2006 | Jonsson et al. | WO | WO 02/25610 | 3/2002 |
| 2006/0152382 | A1 | 7/2006 | Hiltunen | WO | WO 03/023786 | 3/2003 |
| 2006/0155914 | A1 | 7/2006 | Jobs et al. | WO | WO 03/036457 | 5/2003 |
| 2006/0170535 | A1 | 8/2006 | Watters et al. | WO | WO 03/067202 | 8/2003 |
| 2006/0190577 | A1 | 8/2006 | Yamada | WO | 2004/061850 A1 | 7/2004 |
| 2006/0221057 | A1 | 10/2006 | Fux et al. | WO | WO 2004/055637 | 7/2004 |
| 2006/0221788 | A1 | 10/2006 | Lindahl et al. | WO | WO2004/084413 A2 | 9/2004 |
| 2006/0259758 | A1* | 11/2006 | Deng et al. ............ 713/100 | WO | WO 2004/104815 | 12/2004 |
| 2006/0265503 | A1 | 11/2006 | Jones et al. | WO | WO 2005/031737 | 4/2005 |
| 2006/0272483 | A1 | 12/2006 | Honeywell | WO | WO 2005/048644 | 5/2005 |
| 2007/0028009 | A1 | 2/2007 | Robbin et al. | WO | WO 2005/008505 | 7/2005 |
| 2007/0106660 | A1 | 5/2007 | Stern et al. | WO | WO 2005/109781 | 11/2005 |
| 2007/0124679 | A1 | 5/2007 | Jeong et al. | WO | WO 2006/040737 | 4/2006 |
| 2007/0135225 | A1 | 6/2007 | Nieminen et al. | WO | WO 2006071364 | 6/2006 |
| 2007/0248311 | A1 | 10/2007 | Wice et al. | | | |
| 2007/0255163 | A1 | 11/2007 | Prineppi | | | |
| 2008/0055228 | A1 | 3/2008 | Glen | | | |
| 2008/0134287 | A1 | 6/2008 | Gudorf et al. | | | |

FOREIGN PATENT DOCUMENTS

| | | | |
|---|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1289197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |

OTHER PUBLICATIONS

"Apple Introduces iTunes / World's Best and Easiest To Use Jukebox Software," Macworld Expo, San Francisco, Jan. 9, 2001.

"Apple's iPod Available in Stores Tomorrow," Press Release, Apple Computer, Inc., Nov. 9, 2001.

"Combination Belt Clip Leaf Spring and Housing Latch", Wandt et al.; Motorola Technical Developments, Motorla Inc. Schaumburg, IL. vol. 18, Mar. 1, 1993.

"Nomad Jukebox," User Guide, Creative Technology Ltd., Version 1, Aug. 2000.

"SoundJam MP Plus Manual, version 2.0" / MP3 Player and Encoder for Macintosh by Jeffrey Robbin, Bill Kincaid and Dave Heller, manual by Tom Negrino, published by Casady & Greene, Inc., 2000.

"12.1" 925 Candela Mobile PC, downloaded from LCDHardware. com on Dec. 19, 2002, http://www.lcdharware.com/panel/12_1_panel/default.asp.

"*BL82 Series Backlit Keyboards*", www.tg3electronics.com/products/backlit/backlit.htm, downloaded Dec. 19, 2002.

"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.

"Creative liefert erstes Portable Media Center aus" [Online] Sep. 2, 2004, Retrieved from the internet on Sep. 20, 2007 from http://www.golem.de/0409/33347.html>.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi/Media Reporting and Convergence, 2 pgs.
"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly/optical.com/membrane_switches.html.
"Public Safety Technologies Tracer 2000 Computer", downloaded Dec. 19, 2002, http://www.pst911.com/traver.html.
"Quicktime Movie Playback Programming Guide", Apple Computer, Inc., Aug. 11, 2005.
"Quicktime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z....
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.
Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1/2.
Andrew Birrell, "Personal Jukebox (PJB)," Oct. 13, 2000, http://birrell.org/andrew/talks/pjb/overview.ppt.
Apple iPod Technical Specifications, iPod 20GB and 60GB Mac + PC, downloaded from http://www.apple.com/ipod/color/specs.html on Aug. 8, 2005.
Apple iTunes Smart Playlists, downloaded Apr. 5, 2005 from http://web.archive.org/web/20031002011316/www.apple.com/itunes/smartplaylists.... pp. 1-2.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb/.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

De Herrera, Chris, "Microsoft ActiveSync 3.1," Version 1.02, Oct. 13, 2000.
Hart-Daves, Guy, "How To Do Everything with Your IPod & Mini IPod Mini", 2004, McGraw-Hill Professional, p. 33.
iAP Sports Lingo 0x09 Protocol V1.00, May 1, 2006.
IEEE 1394—Wikipedia, 1995, http://www.wikipedia.org/wiki/Firewire.
International Search Report dated Feb. 4, 2003 in corresponding application No. PCT/US2002/033330.
International Search Report dated Jul. 10, 2007 in corresponding application No. PCT/US2006/048738.
International Search Report dated Apr. 5, 2006 from corresponding International Application No. PCT/US2005/038819.
International Search Report dated Dec. 5, 2007 in PCT Application No. PCT/US2007/004810.
International Search Report dated Feb. 18, 2008 in Patent Application No. PCT/US2007/079766.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report dated Nov. 24, 2006 in PCT Application No. PCT/US2005/046797.
International Search Report Dated Sep. 27, 2007 in Application No. 05824296.7.
International Search Report in corresponding European Application No. 06256215.2 dated Feb. 20, 2007.
International Search Report in Patent Application No. PCT/US2006/048738 dated Jan. 29, 2008.
International Search Report in Patent Application No. PCT/US2007/076889 dated Jan. 28, 2008.
International Search Report in Patent Application No. PCT/US2007/077020 dated Jan. 28, 2008.
Invitation to Pay Additional Fees and Partial Search Report for corresponding PCT Application No. PCT/US2005/046797 dated Jul. 3, 2006.
Invitation to Pay Additional Fees and Partial Search Report for PCT Application No. PCT/US2007/077160 dated Apr. 1, 2008.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
iTunes, Wikipedia, the free encyclopedia; downloaded on Oct. 5, 2005, pp. 1-6.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Nonhoff-Arps, et al., "Straßenmusik Portable MP3-Spieler mit USB-Anschluss," CT Magazin Fuer Computer Technik, Verlag Heinz Heise GMBH, Hannover DE, No. 25, Dec. 4, 2000.
Notification of Reason for Rejection from PCT Application No. 2003-539048 dated Nov. 27, 2007.
Nutzel et al., "Sharing Systems for Future HiFi Systems", The Computer Society, Jun. 2004.
Office Action dated Apr. 4, 2008 in U.S. Appl. No. 11/212,555.
Office Action Dated Feb. 1, 2008 in U.S. Appl. No. 11/327,544.
Office Action dated Feb. 20, 2008 in Japanese Application No. 2007-538196.
Office Action dated Feb. 25, 2008 in U.S. Appl. No. 11/749,599.
Office Action Dated Feb. 4, 2008 in U.S. Appl. No. 11/566,072.
Office Action dated Mar. 4, 2008 from U.S. Appl. No. 10/973,657.
Partial International Search Report dated Feb. 1, 2008 in Patent Application No. PCT/US2007/010630.

Partial Search Report dated Sep. 6, 2007 in PCT Application No. PCT/US2007/004810.
*Personal Jukebox (PJB)*, "Systems Research Center and PAAD," *Compaq Computer Corp.*, Oct. 13, 2000, http://research.compaq.com/SRC/pjb/.
Peter Lewis, "Two New Ways to Buy Your Bits," CNN Money, Dec. 31, 2003, pp. 1/4.
Sastry, Ravindra Wadali. "A Need for Speed: A New Speedometer for Runners", submitted to the Department of Electrical Engineering and Computer Science at the Massachusetts Institute of Technology, May 28, 1999.
Search Report dated Mar. 20, 2008 in Patent Application No. PCT/US2007/077789.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "*Low-decibel earbuds keep noise at a reasonable level*", The Telegraph Online, dated Aug. 13, 2006, http://www.nashuatelegraph.com/apps/pbcs.dll/article?Date=20060813&Cate.. Downloaded Aug. 16, 2006.
Steinberg, "*Sonicblue Rio Car*," Product Review, Dec. 12, 2000, http://electronics.cnet.com/electronics/0/6342420/1304/4098389.html.
Travis Butler, "*Archos Jukebox 6000 Challenges Nomad Jukebox*," Aug. 13, 2001, http://db.tidbits.com/getbits.acgi?tbart=06521.
Travis Butler, "*Portable MP3: The Nomad Jukebox*," Jan. 8, 2001, http://db.tidbits.com/getbits.acgi?tbart=06261.
U.S. Appl. No. 11/621,541, "Personalized Podcasting Podmapping" filed Jan. 9, 2007.
Waterproof Music Player with FM Radio and Pedometer User Manual, Oregon Scientific, 2005.
Written Opinion dated Dec. 5, 2007 in PCT Application No. PCT/US2007/004810.
Written Opinion dated Feb. 18, 2008 in Patent Application No. PCT/US2007/079766.
Written Opinion dated Mar. 20, 2008 in Patent Application No. PCT/US2007/077789.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Written Opinion of the International Searching Authority dated Nov. 24, 2006 in PCT Application No. PCT/US2005/046797.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
International Search Report dated Jul. 7, 2008 in PCT Application No. PCT/US2007/076793.
International Search Report dated Jun. 10, 2008 in PCT Application No. PCT/US2007/010630.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Jun. 17, 2008 in U.S. Appl. No. 11/212,313.
Office Action dated May 30, 2008 in Chinese Patent Application No. 02825938.6.
Office Action dated Oct. 16, 2008 in U.S. Appl. No. 11/327,544.
Office Action in Japanese Patent Application No. 2008-045351 dated Aug. 5, 2008.
Office Action in U.S. Appl. No. 11/212,555 dated Aug. 14, 2008.
Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association For Computing Machinery, Conference Proceedings, Apr. 5, 2003.
U.S. Appl. No. 11/144,541, filed Jun. 3, 2005.
U.S. Appl. No. 11/481,303, filed Jul. 3, 2006.
U.S. Appl. No. 11/530,807, filed Sep. 11, 2006.
U.S. Appl. No. 11/530,767, filed Sep. 11, 2006.
U.S. Appl. No. 11/530,768, filed Sep. 11, 2006.
International Search Report dated Mar. 20, 2008 from PCT Application No. PCT/US2007/077789.
Written Opinion dated Mar. 20, 2008 from PCT Application No. PCT/US2007/077789.
Office Action dated May 11, 2009 in U.S. Appl. No. 11/680,580.
Notice of Allowance dated Apr. 21, 2009 in U.S. Appl. No. 11/327,544.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Written Opinion dated Oct. 10, 2008 in PCT Application No. PCT/US2007/077160.
Office Action dated Jan. 26, 2009 in U.S. Appl. No. 11/373,468.
Office Action dated Sep. 1, 2008 in EP Application No. 06 256 215.2.
Written Opinion dated Jan. 6, 2009 in Singapore Application No. 200701865-8.
Office Action dated Mar. 30, 2009 in U.S. Appl. No. 11/515,270.
Office Action dated Apr. 9, 2009 in U.S. Appl. No. 11/583,199.
Office Action dated May 27, 2009 in U.S. Appl. No. 11/439,613.
Notice of Allowance dated Jun. 15, 2009 in U.S. Appl. No. 11/212,313.
Office Action dated Jun. 24, 2009 in U.S. Appl. No. 11/373,468.
Office Action dated Jun. 22, 2009 in U.S. Appl. No. 11/515,270.
Office Action dated Jun. 24, 2009 in U.S. Appl. No. 11/519,352.

* cited by examiner

*(media player application)*

*(game application)*

PORTABLE MEDIA PLAYBACK DEVICE INCLUDING USER INTERFACE EVENT PASSTHROUGH TO NON-MEDIA-PLAYBACK PROCESSING

BACKGROUND

Portable electronic devices for media playback are becoming ever more popular. For example, a very popular portable media player is the line of iPod® media players from Apple Computer, Inc. of Cupertino, Calif. In addition to media playback, the iPod® media players also provide non-media-playback capabilities, including game playing capabilities.

SUMMARY

The inventors have realized that it is desirable to create an integrated media playback and non-media-playback experience.

Methods of operating a portable electronics device can include integrated operation of media playback processing and non-media-playback processing (such as, for example, game processing). The method can include receiving an event corresponding to operation of a user interface item by a user of the portable electronics device. The received event can be provided to the non-media-playback processing. The non-media-playback processing can determine whether to cause an action corresponding to the provided received event with respect to the non-media-playback processing.

For an event determined by the non-media-playback processing to not cause an action corresponding to the provided received event with respect to the non-media-playback processing, the provided received event can be provided to the media playback processing. Typically, the operating performed by the media playback processing based on the event can be the processing that would otherwise be performed by the media playback processing if the non-media-playback processing was not even occurring.

DETAILED DESCRIPTION

Methods are described to handle UI events to a portable electronics device such that the UI events may be operated upon by media playback processing and non-media-playback processing, as appropriate. The media playback processing and the non-media-playback processing may occur, at least when considered at a macroscopic level, in parallel. For example, the media playback processing may include playback of songs, such as is a commonly-known function of an iPod® media player. In general, the media playback nominally occurs in a predictive manner and, while user interaction may affect the media playback audio (e.g., by a user activating a "fast forward" or other user interface item), the media playback nominally occurs in a predictive manner.

In one example, an event corresponding to operation of a user interface item by a user of the portable electronics device is received. The received event is provided to the non-media-playback processing. The non-media-playback processing includes processing to determine whether to cause an action corresponding to the provided received event, with respect to the non-media-playback processing. For an event determined by the non-media-playback processing to not cause an action corresponding to the received event with respect to the non-media-playback processing, the received event is provided to the media playback processing.

A game application is an example of non-media-playback processing. That is, the game application substantially operates responsive to game-playing actions of a user of the portable media player. In this respect, the game video is not nominally generated in a predictive manner, as is the case with media playback processing.

Figure 1:
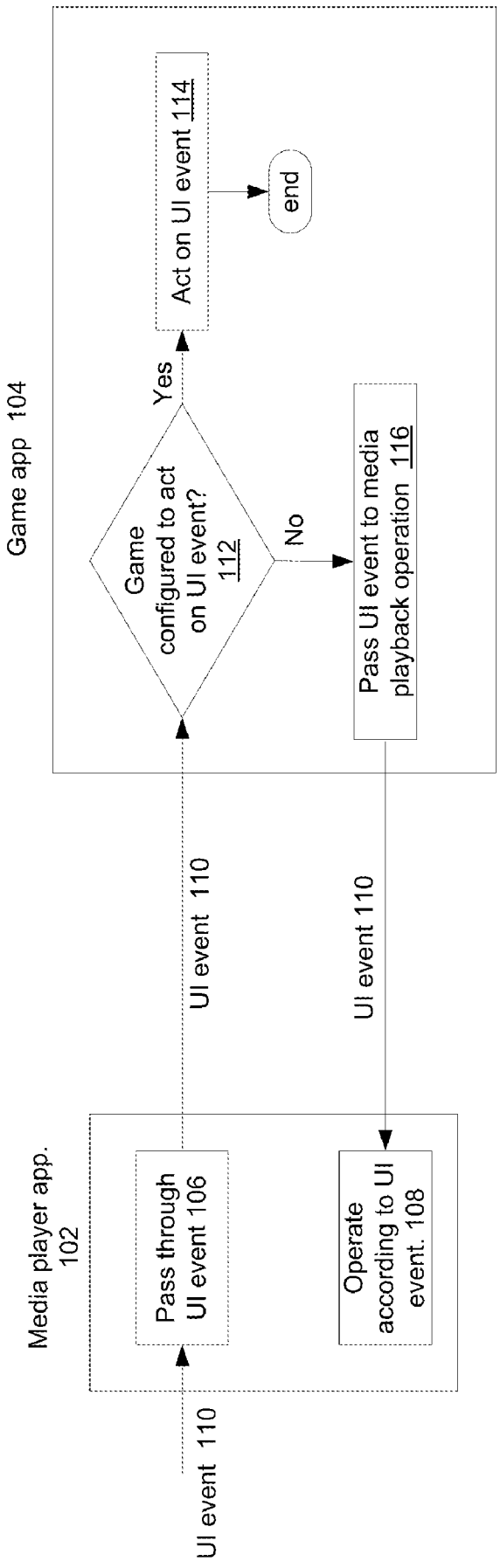
FIG. 1 is an architecture diagram broadly illustrating an example of processing to handle UI events to a portable electronics device such that the UI events may be operated upon by media playback processing and non-media-playback processing, as appropriate.

FIG. 1 is an architecture diagram broadly illustrating an example of this processing. As shown in FIG. 1, a user interface event 110 is received by the media player application 102 executing on a portable media player device. For example, the user interface event 110 is a result of a user interacting with a user interface (for example, a physical or virtual knob, switch etc.) of the portable media player. At step 106 of processing with the media player application 102, the media player application 102 passes through the UI event 110 to the non-media-playback application 104 (in this example, a game playing application).

At step 112, within the game playing application 104, the game playing application 104 determines whether it is configured to act on the UI event 110 that was passed to the game playing application 104 through the media player application 102. If the determination at step 112 is yes, then the UI event is acted upon at step 114, within the game playing application 104.

Otherwise, at step 116 within the game playing application 104, the UI event is passed back to the media player application 102. Then, at step 108 within the media player application 102, the UI event is acted upon by the media player application.

Figure 3:
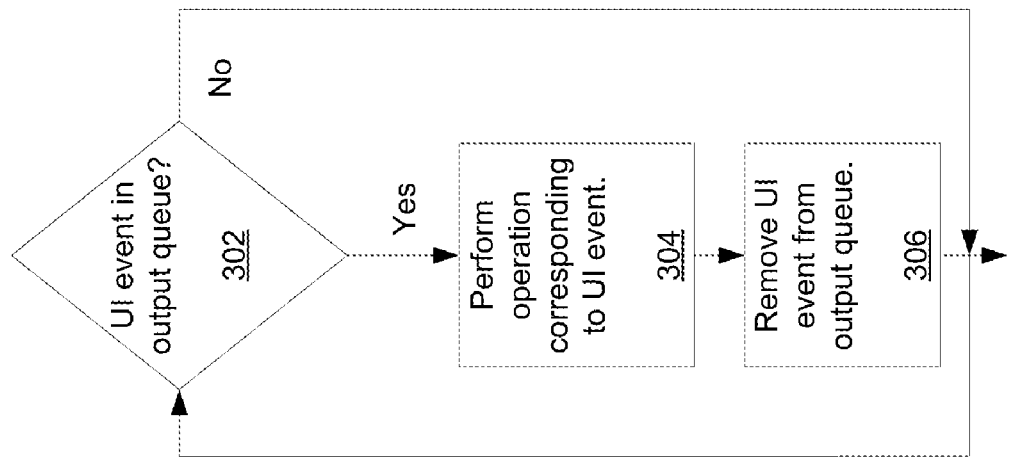
FIG. 3 is a flowchart illustrating processing of a media player application.
Figure 2:
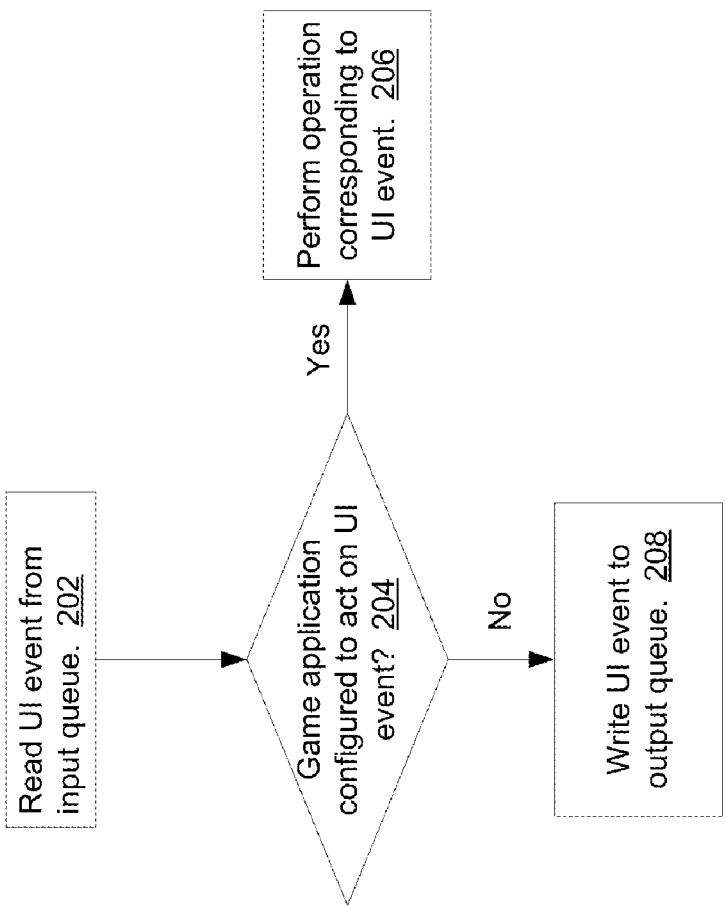
FIG. 2 is a flowchart illustrating processing within a non-media-playback (e.g., game) application.

FIGS. 2 and 3 illustrate a particular implementation of the UI event processing, wherein an input queue and an output queue are employed for handling the UI events. FIG. 2 illustrates processing within the non-media-playback (e.g., game) application. At step 202, a UI event is read from an input queue. At step 204, the game application determines if it is configured to act on the UI event. If yes, the game application acts on the UI event at step 206. If no, the game application operates to write the UI event to an output queue.

Meanwhile, the media player application (FIG. 3) operates on a frame-by-frame basis. Within one frame of processing, step 302 (and, in some instances, discussed below), step 304 and step 306 are performed. At step 302, it is determined if there is a UI event in the output queue. (Remember, a UI event ends up in the output queue as a result of step 208 of the game application processing, where the game application is not configured to act on the UI event.) If, at step 302, there is not a UI event in the output queue, then processing returns to step 302, for a subsequent frame.

Otherwise, if at step 302 there is a UI event in the output queue, then an operation is performed, at step 304, corresponding to the UI event. At step 306, the just-processed UI event is removed from the output queue.

As an example, the UI event may correspond to the "next button up." For example, if a game or other non-media-playback processing is not configured to handle this event, then the media playback processing will perform a "standard" next command. This may include traversing to the next chapter, if playing a chaptered track such as a podcast or audiobook, or playing the next playable track in the "now playing" list. In other words, the typically, the operating performed by the media playback processing based on the event is the processing that would otherwise be performed by the media playback processing if the non-media-playback processing was not even occurring.

Thus, the non-media-playback processing can determine which events to handle, and other events can be passed back to the playback processing.

The following applications are incorporated herein by reference in their entirety: U.S. patent application Ser. No. 11/882,427, filed concurrently herewith, entitled "TECHNIQUES FOR INTERACTIVE INPUT TO PORTABLE ELECTRONIC DEVICES," and U.S. patent application Ser. No. 11/530,846, filed concurrently herewith, entitled "ALLOWING MEDIA AND GAMING ENVIRONMENTS TO EFFECTIVELY INTERACT AND/OR AFFECT EACH OTHER."

What is claimed is:

1. A method of integrated operation of media playback processing and non-media-playback processing by a portable electronic device, the method comprising:
   receiving a user input event for selecting an operation to be performed by the portable electronic device;
   operating in a mode by the portable electronic device suitable for processing the selected operation without further user interaction by,
   providing the received event directly to the media playback processing;
   passing the received event directly to the non-media playback processing by the media playback processing;
   if the non-media playback processing determines that selected operation is to be performed by the non-media playback processing, then the non-media playback processing performs the selected operation, otherwise, automatically passing the received event to the media playback processing; and
   performing the selected operation corresponding to the received event by the media playback processing.

2. The method of claim 1, wherein:
   passing the received event to the non-media-playback processing includes providing an indication of the event to a data structure associated with the non-media-playback processing.

3. The method of claim 2, wherein:
   the automatically passing the received event to the media playback processing includes removing the indication of the event from the data structure associated with the non-media-playback processing and providing the indication of the event to a data structure associated with the media playback processing.

4. The method of claim 1, wherein:
   the non-media-playback processing includes processing for a game.

5. The method of claim 1, wherein:
   the non-media-playback processing determines to not cause an action corresponding to the provided received event with respect to the non-media-playback processing; and
   the method further comprises the media playback processing causing an operation to be performed on the provided received event.

6. The method of claim 5, wherein:
   the selected operation is performed by the media playback processing in the absence of the non-media playback processing.

7. A computer readable medium for storing program code for operating a portable electronic device including integrated operation of media playback processing and non-media-playback processing, the computer readable medium comprising:
   computer code for receiving a user input event for selecting an operation to be performed by the portable electronic device;
   computer code for causing the portable electronic device to operate in a mode suitable for processing the selected operation without further user interaction, comprising:
   computer code for providing the received event directly to the media playback processing;
   computer code for passing the received event directly to the non-media playback processing by the media playback processing;
   computer code for determining if the selected operation is to be performed by the non-media playback processing, then the non-media playback processing performs the operation, otherwise, automatically passing the received event to the media playback processing; and
   computer code for performing the operation corresponding to the received event by the media playback processing.

8. The computer readable medium of claim 7, wherein:
   the computer code for determining includes computer code for providing an indication of the event to a data structure associated with the non-media-playback processing.

9. The computer readable medium of claim 8, further comprising:
   computer code for removing the indication of the event from the data structure associated with the non-media-playback processing and providing the indication of the event to a data structure associated with the media playback processing.

10. The computer readable medium of claim 7, wherein:
    the non-media-playback processing includes processing for a game.

11. The computer readable medium of claim 7, wherein:
    the non-media-playback processing determines to not cause an action corresponding to the provided received event with respect to the non-media-playback processing; and
    the computer program product further comprising computer program instructions which are operable to cause the media playback processing to perform an operation on the provided received event.

12. The computer readable medium of claim 11, wherein:
    the selected operation is performed by the media playback processing in the absence of the non-media-playback processing.

13. A portable electronic device configured to operate media playback processing and non-media-playback processing in an integrated manner, the portable electronic device comprising:
    a user interface adapted to receive user inputs; and
    processing circuitry, adapted to perform the media playback processing and the non-media-playback processing, the processing circuitry configured to receive from the user interface a user provided input event for selecting an operation to be performed by the portable electronic device, and cause the portable electronic device to operate in a mode suitable for processing the selected operation without further user interaction by providing the received event directly to the media playback processing, passing the received event directly to the non-media-playback processing by the media playback processing, if the selected operation is to be performed by the non-media-playback processing, then the non-playback-processing performs the operation otherwise, the received event is automatically passed to the media playback processing, and the selected operation is performed by the media playback processing.

14. The portable electronic device of claim 13, wherein:
the processing circuitry being configured to cause the portable electronic device to provide the received event to the non-media-playback processing includes the processing circuitry being configured to cause the portable electronic device to provide an indication of the event to a data structure associated with the non-media-playback processing.

15. The portable electronic device of claim 14, wherein:
the processing circuitry being configured to cause the portable electronic device to provide the received event to the media playback processing, the processing circuitry being configured to cause the portable electronic device to remove the indication of the event from the data structure associated with the non-media-playback processing and providing the indication of the event to a data structure associated with the media playback processing.

16. The portable electronic device of claim 13, wherein:
the non-media-playback processing includes processing for a game.

17. The portable electronic device of claim 13, wherein:
the non-media-playback processing determines to not cause an action corresponding to the provided received event with respect to the non-media-playback processing; and
the processing circuitry is further configured to cause the media playback processing to perform an operation on the provided received event.

18. The portable electronic device of claim 17, wherein:
the operation caused to be performed on the provided received event, by the media playback processing, is the operation that would otherwise be cause to be performed on the provided received event in the absence of the non-media-playback processing.

* * * * *